(12) United States Patent
Nelson

(10) Patent No.: US 7,883,065 B2
(45) Date of Patent: Feb. 8, 2011

(54) MOUNTING BRACKET

(75) Inventor: Thomas Nelson, West Milford, NJ (US)

(73) Assignee: Bogen Communications, Inc., Ramsey, NJ (US)

( * ) Notice: Subject to any disclaimer, the term of this patent is extended or adjusted under 35 U.S.C. 154(b) by 57 days.

(21) Appl. No.: 12/456,396

(22) Filed: Jun. 16, 2009

(65) Prior Publication Data

US 2010/0314514 A1     Dec. 16, 2010

(51) Int. Cl.
*F16M 11/00* (2006.01)
(52) U.S. Cl. ............ 248/201; 248/70; 248/218.4; 248/230.9; 248/274.1; 248/299.1
(58) Field of Classification Search ............ 248/65, 248/70, 201, 218.4, 219.4, 227.3, 230.1, 248/230.9, 274.1, 299.1
See application file for complete search history.

(56) References Cited

U.S. PATENT DOCUMENTS

| 3,458,964 | A | * | 8/1969 | Guilliams | .......... 52/365 |
|---|---|---|---|---|---|
| 4,049,948 | A | * | 9/1977 | Gilreath | .......... 219/404 |
| 4,926,399 | A | * | 5/1990 | Hickman | .......... 367/173 |
| 5,012,998 | A | * | 5/1991 | Gautier et al. | .......... 248/222.14 |
| 6,766,992 | B1 | * | 7/2004 | Parker | .......... 248/300 |
| 7,578,488 | B2 | * | 8/2009 | Kiser | .......... 248/218.4 |
| 7,641,163 | B2 | * | 1/2010 | O'Keene | .......... 248/292.14 |
| 7,669,817 | B2 | * | 3/2010 | Scott | .......... 248/205.1 |
| 2002/0027091 | A1 | * | 3/2002 | Brown | .......... 206/372 |
| 2004/0195478 | A1 | * | 10/2004 | Baldasari | .......... 248/218.4 |
| 2007/0295866 | A1 | * | 12/2007 | Yang | .......... 248/70 |
| 2008/0011919 | A1 | * | 1/2008 | Wen et al. | .......... 248/219.4 |
| 2009/0084910 | A1 | * | 4/2009 | White | .......... 248/70 |

* cited by examiner

*Primary Examiner*—Terrell Mckinnon
*Assistant Examiner*—Bradley H Duckworth
(74) *Attorney, Agent, or Firm*—Collard & Roe, P.C.

(57) ABSTRACT

A mounting bracket assembly has a stationary bracket to be mounted on a pole or other surface, and an adjustable bracket to be attached to the object to be mounted. The adjustable bracket is then positioned on the stationary bracket to mount the object on the surface or pole. The adjustable bracket is first mounted on the stationary bracket in a preliminary mounting position using integrated hooks and latches, and then can be easily adjusted to a permanent mounting position and secured with screws.

8 Claims, 5 Drawing Sheets

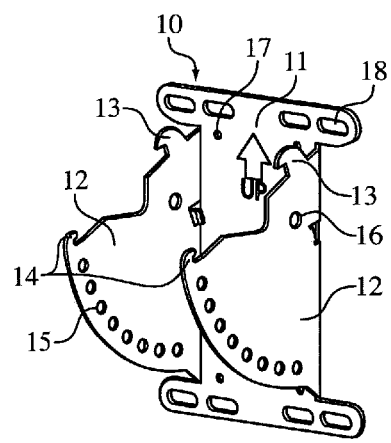
FIG. 1
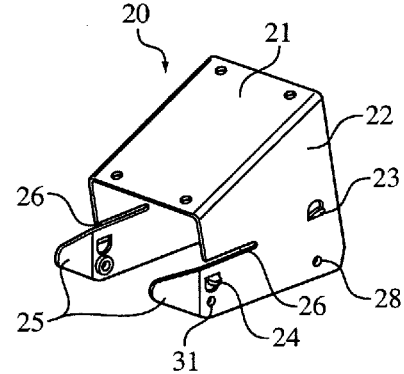
FIG. 2
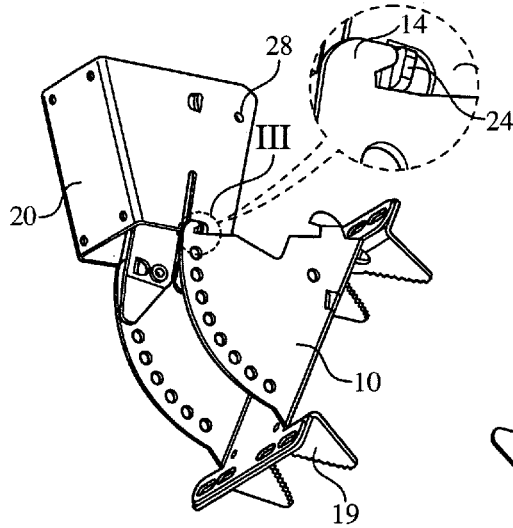
FIG. 3a
FIG. 3
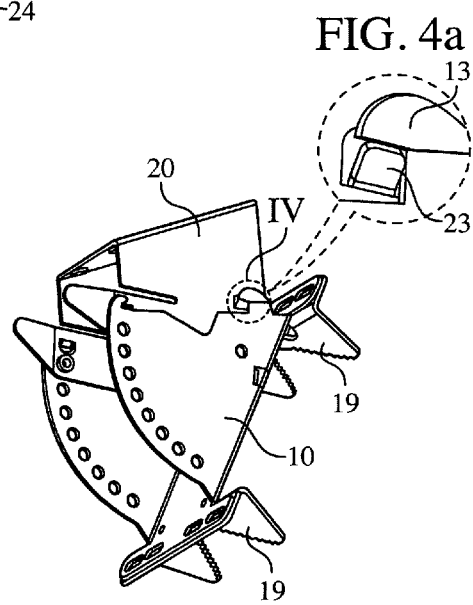
FIG. 4a
FIG. 4

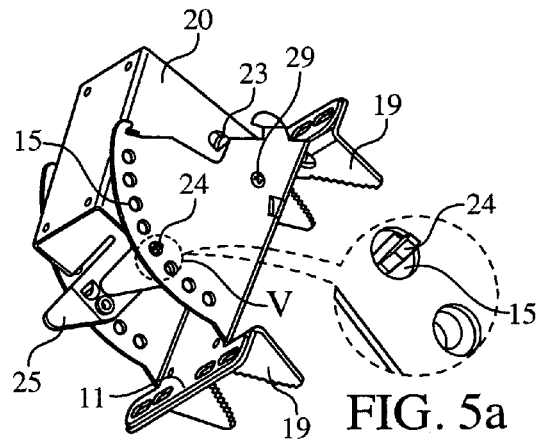
FIG. 5
FIG. 5a
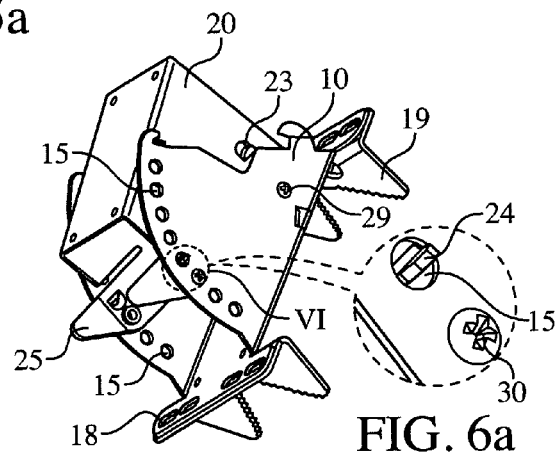
FIG. 6
FIG. 6a
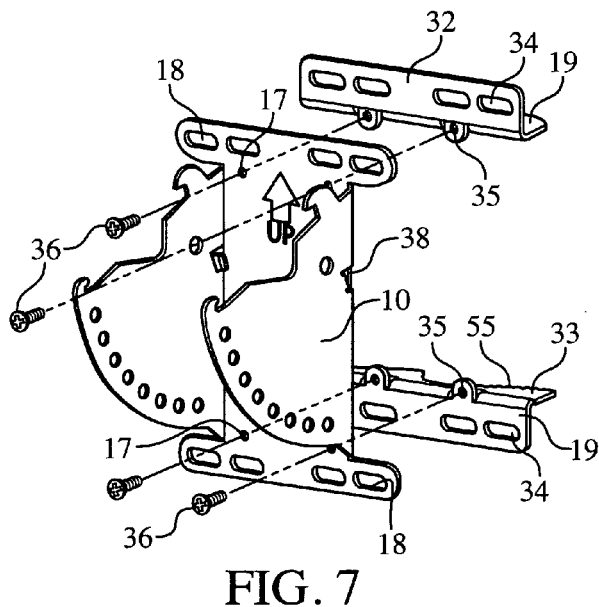
FIG. 7

MOUNTING BRACKET

BACKGROUND OF THE INVENTION

1. Field of the Invention

The invention relates to a bracket for use in mounting speakers or other equipment to a pole, flat surface, or other structure. In particular, the invention relates to a two-part bracket that allows simple mounting of the equipment to the mounting surface by connecting the two parts of the bracket together.

2. The Prior Art

In order to mount a speaker or other object onto a pole, a pipe clamp is commonly used. The pipe clamp contains a U-bolt that is specifically sized for a single pipe diameter. The U-bolt usually has threaded ends for nuts to provide an extreme clamping force against the pole. One disadvantage of this type of system is that it requires a different pipe clamp for each size of pole. Another disadvantage is that the installer is required to hold the speaker or other object in place and to tighten the bolts at the same time. This operation thus usually requires two people for installation.

SUMMARY OF THE INVENTION

It is therefore an object of the invention to provide a mounting bracket that can be used to install a speaker or other object on a variety of surfaces of different sizes. It is another object of the invention to provide a mounting bracket that can be used by one person to install the object in a simple and effective manner.

These and other objects are accomplished by a mounting bracket assembly comprising a stationary bracket to be mounted on a pole or other surface, and an adjustable bracket to be attached to the object to be mounted. The adjustable bracket is then positioned on the stationary bracket to mount the object on the surface or pole.

The invention provides the means to mount a product on a pole, pipe, column, or the like, and allow the product to be easily aimed in a particular direction, using separate pole adapters. It can also be used on walls without the pole adapters. It should be resistant to weather, wind, and vibration because it will typically be used outdoors. Stainless steel components are preferable. The bracket assembly is suitable for loudspeakers, lighting, signage, displays, monitors, video cameras, etc.

The invention is specifically designed for one person to install a fairly heavy item. The installer never needs to support the weight of the object and handle attachment hardware simultaneously. Competitive solutions require additional parts, more installers, expensive manufacturing methods, multiple adapters, etc. This system uses a minimal amount of inexpensive but robust components, providing both economic and time based efficiency for the installer.

The bracket assembly consists of two major components: a stationary bracket and an adjustable bracket. The stationary bracket is attached to the mounting surface, such as a wall, pole, column, etc. The adjustable bracket is attached to the product that requires directional positioning, and this can be done in a more convenient location than at the mount site which may be relatively inaccessible. Tapered springs guide the two brackets together during the initial mating. The adjustable bracket is then rotated into a locked position, and the two mount halves snap together temporarily (without tools or hardware) using integrated hooks and tabs. After this minimal effort, grip on the product can be released to allow for easy completion of the installation process. Two axel screws are inserted loosely through the adjustable bracket into locking threads in the stationary bracket. This forms the hinge, and the assembly is safely secured and ready for adjustment (although tightening of 4 mating screws and a safety tether is required for permanent use). To adjust the adjustable bracket, the tabs are released by compressing the angle adjustment wings on the adjustable bracket, and the product can then be rotated down. The spring causes these tabs to sequentially engage a series of holes so the user can evaluate the dispersion pattern or viewing angle achieved. When the desired position is selected, two screws permanently attach the brackets together and provide additional torque resistance. Finally the two axel screws are tightened to create 4 solid attachment points, and vertical adjustment from 0 to −70 degrees is achieved.

For use on poles and the like, the product includes a pole clamp assembly. Two adapter brackets with stepped teeth are attached to the stationary bracket. These adapters are designed for an ideal fit on 1-4" cylinders, making contact with the cylinder at 4 points each. Larger diameters and irregular shapes can be accommodated, although contact points will likely be reduced to two per adapter. For convenience, a supplied nylon wire tie or other temporary tether is inserted through an opening in the stationary bracket. This can temporarily fasten the stationary bracket with adapters to the pole while clamp components are secured. The clamp is comprised of a length of link chain with a threaded J-hook or hooked rod at each end. These J-hooks pass through aligned slotted openings in the stationary bracket and pole adapters. Wing nuts on the J-hooks provide the means to easily tension the chain adequately without the need for tools, while preventing excessive clamping force. This combination of components fits a wide variety of pole shapes and sizes, produces excellent resistance to rotation, and reduces the likelihood of over tensioning. Additional tension on the clamp components only weakens the system, and wing nuts discourage overtightening. After installation, the stationary mounting bracket is directly secured to the pole via the chain, hooks, and wing nuts, with the adapters trapped in between. This assembly can be tightened in any position around a pole, providing 360 degrees of horizontal adjustment. This clamp needs only to prevent rotation or slippage and, by nature, chain provides excellent resistance to these forces.

A speaker mounting bracket can be attached to the adjustable bracket, so that a loudspeaker can be mounted using the assembly according to the invention. The speaker mounting bracket is securely screwed to the adjustable bracket, and the speaker is mounted on the speaker mounting bracket. The assembly of the speaker, speaker mounting bracket and adjustable bracket can then be easily mounted on the stationary bracket to mount the speaker to a pole or other surface.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows an embodiment of the stationary bracket for use in the assembly according to the invention;

FIG. 2 shows an embodiment of the adjustable bracket for use with the stationary bracket of FIG. 1;

FIG. 3 shows the initial placement of the adjustable bracket of FIG. 2 onto the stationary bracket of FIG. 1;

FIG. 3a shows an enlarged detail III of FIG. 3;

FIG. 4 shows the preliminary mounting position of the adjustable bracket onto the stationary bracket;

FIG. 4a shows enlarged detail IV of FIG. 4;

FIG. 5 shows the placement of the adjustable bracket into a final mounting position on the stationary bracket;

FIG. 5a shows enlarged detail V of FIG. 5;

FIG. 6 shows the final mounting position of FIG. 5, with the screws attached to secure the adjustable bracket to the stationary bracket;

FIG. 6a shows enlarged detail VI of FIG. 6;

FIG. 7 shows the pole mounting brackets and how they are mounted to the stationary bracket of FIG. 1;

DETAILED DESCRIPTION OF THE PREFERRED EMBODIMENT

Figure 8:
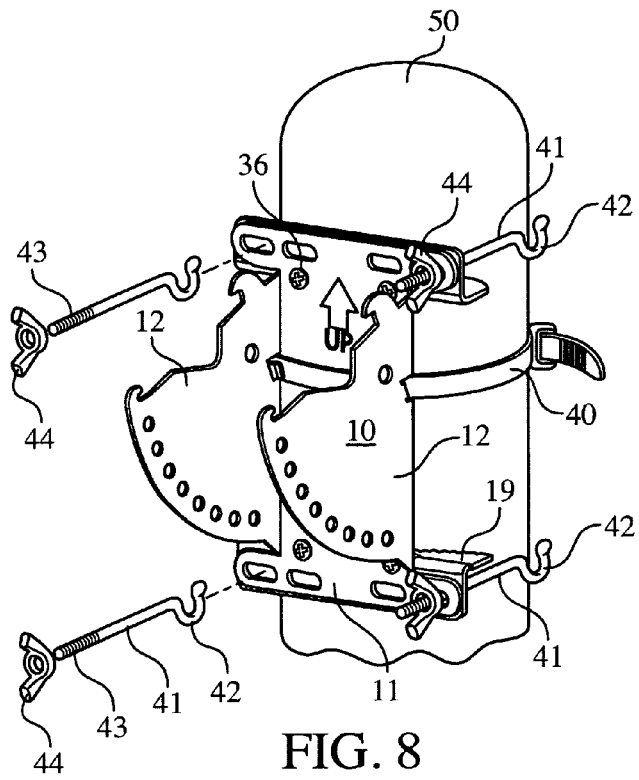
FIG. 8 shows a front view of the stationary bracket mounted on a pole.

Referring now in detail to the drawings and, in particular, FIG. 1 shows stationary bracket 10 for use in the assembly according to the invention. Stationary bracket 10 has a flat rear panel 11 and two side walls 12, extending from panel 11. Side walls 12 have an upper edge with hooks 13, 14, and a curved front edge with a series of apertures 15. Side walls 12 also have a rear aperture 16. Rear panel 11 has a plurality of mounting holes 17, for mounting rear panel 11 on a flat surface, and also has slits 18 and supports brackets 19 (shown in FIGS. 3 and 4) for securing stationary bracket 10 to a pole, which will be described in detail below.

FIG. 2 shows one embodiment of an adjustable bracket 20 for use in the assembly according to the invention. Bracket 20 has a top surface 21, and side walls 22 with flexible wings 25 below a slit 26. Tabs 23 and 24 are disposed along the rear and front areas, respectively, of side walls 22.

To connect adjustable bracket 20 to stationary bracket 10, as shown in FIGS. 3 and 4, tabs 24 on bracket 20 are placed into engagement with hooks 14 on bracket 10 (also shown in detail in FIG. 3a), and bracket 20 is rotated into position, so that tabs 23 on bracket 20 engage hooks 13 (shown in detail in FIG. 4a). This creates a temporary mounting position, where bracket 20 is supported by bracket 10 until a final adjustment position can be reached.

To reach a final adjustment position, where adjustable bracket 20 is placed at the desired angle with respect to stationary bracket 10, two axel screws 29 are placed loosely through holes 16 and 28 on each side of brackets 10, 20 to hold them together. Then, wings 25 are pressed inward until tabs 23 and 24 clear hooks 13 and 14, respectively, as shown in FIGS. 5 and 5a. Then, bracket 20 is rotated downward until a desired angle is reached. At this point, wings 25 can be released, which places tab 24 into one of the holes 15 along stationary bracket 10. If the installer is satisfied with this position, then a further screw 30 is placed into one of holes 15 adjacent to tab 24, which screw also extends though hole 31 on bracket 20. Finally all of screws 29, 30 are tightened to secure bracket 20 to bracket 10 in a final position.

Prior to connection of bracket 20 to bracket 10, the object to be mounted is connected to bracket 20, and bracket 10 is connected to the mounting surface, such as a wall or a pole. Then, bracket 20 is secured to bracket 10, to mount the object to the mounting surface, in a simple manner. This way, even large, cumbersome objects can be securely mounted to a pole or a wall by a single installer.

As described above, bracket 10 can be mounted to a wall or other flat surface via holes 17, in any conventional manner. For pole mounting, the arrangement shown in FIGS. 7-9 can be used. As shown in FIG. 7, pole mounting bracket 19, which has a vertical section 32 with slots 34 and a horizontal pole-mounting section 33, can be attached to stationary bracket 10 via screws 36 through holes 17 on bracket 10, and holes 35 on brackets 19.

Figure 9:
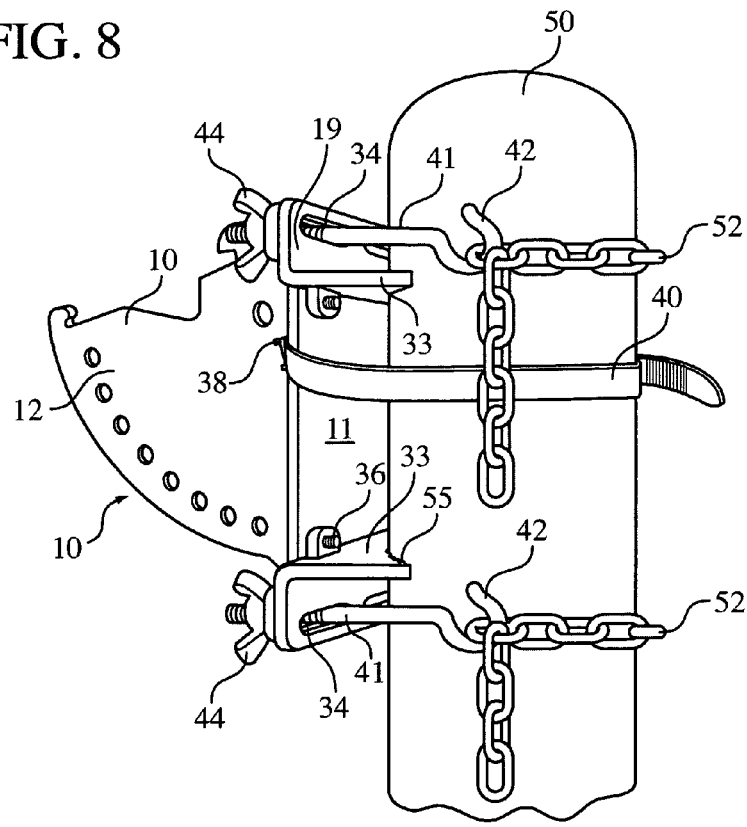
FIG. 9 shows a side and rear view of the stationary bracket mounted on a pole.

The mounting of bracket 10 to a pole 50 is shown in FIGS. 8 and 9. Bracket 10, with bracket 19 secured thereto, is placed against a pole 50, so that horizontal section 33 of bracket 19 abuts pole 50. Horizontal section 33 has a cutout to create ridged sections 55, which can grip poles of various sizes, to reduce any slippage between pole 50 and brackets 19. A strap 40 is then threaded through bracket 10 via slots 38 disposed on side walls 12 just in front of rear panel 11. Strap 40 keeps bracket 10 in place until further securing measures are taken.

Subsequently, hooked securing rods 41 are fed through slots 18 and 34 in brackets 10, 19, respectively, and secured on threaded portions 43 with wing nuts 44. Securing rods 41 each have a hook 42 on its opposite end, which extends along pole 50. As shown in FIG. 9, a chain is then hooked on hooks 42 to wrap around pole 50 to further secure bracket 10 to pole 50. Finally, wing nuts 44 are tightened further to eliminate any slack in chain 52, thus creating a tight connection between stationary bracket 10 and pole 50.

Figure 10:
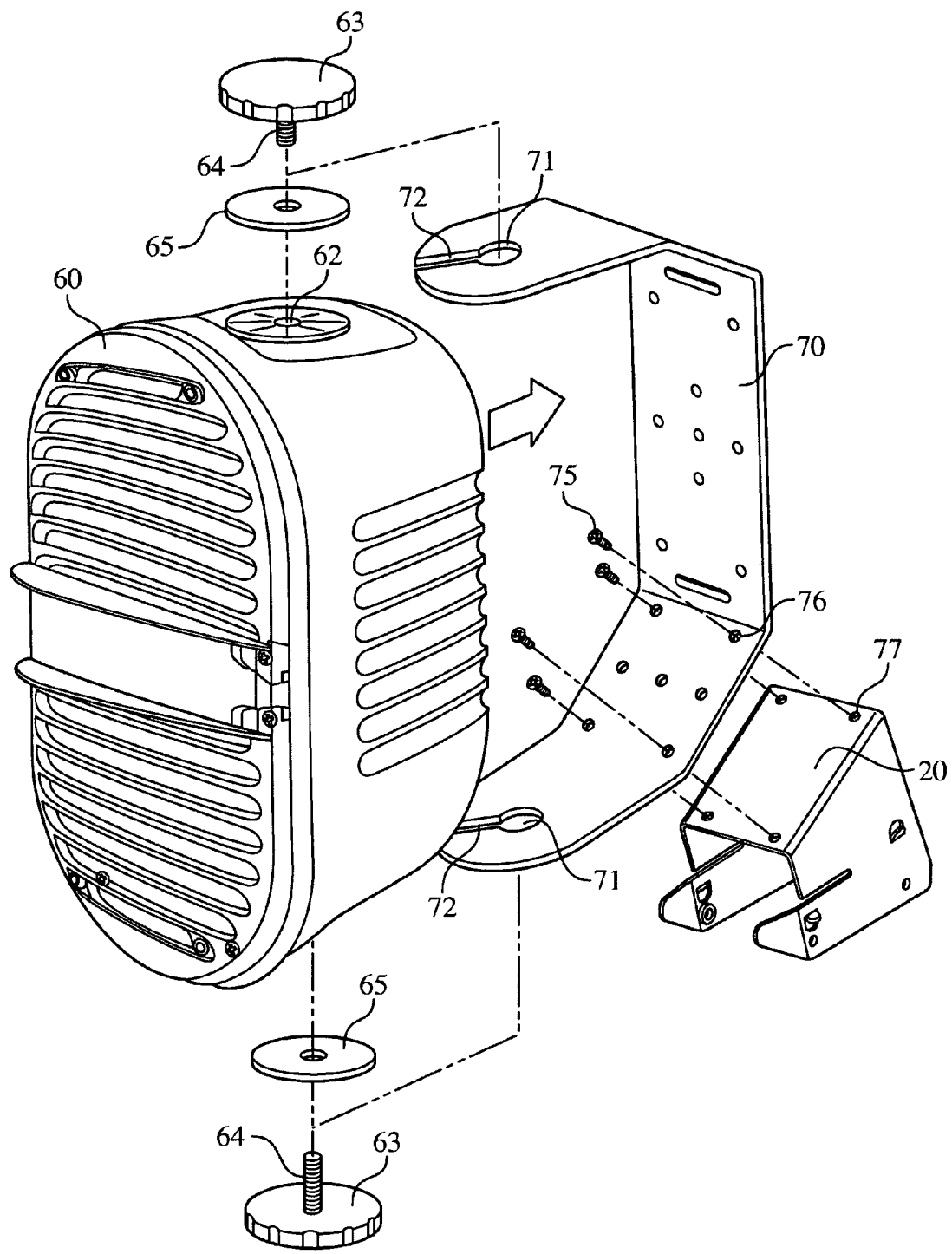
FIG. 10 shows a speaker and a speaker mounting bracket for use with the adjustable bracket of FIG. 2.

FIG. 10 shows a possibility for mounting a speaker 60 to adjustable bracket 20. First, speaker bracket 70 is attached to adjustable bracket 20 by screws 75 through holes 76 in speaker bracket 70 and holes 77 in adjustable bracket 20. Knobs 63 are attached to speaker 60 on its top and bottom by extending threaded portion 64 of knob 63 through a washer 65 and then loosely screwing knob 63 into holes 62 on the top and bottom of speaker 60. Thereafter, speaker bracket 70 is attached to speaker 60 by sliding speaker bracket 70 onto threaded portions 64 of knobs 63 via slits 72 until threaded portion 64 resides within aperture 71. Then, knobs 63 are tightened to secure speaker 60 to speaker bracket 70, as well as adjustable bracket 20.

Figure 11:
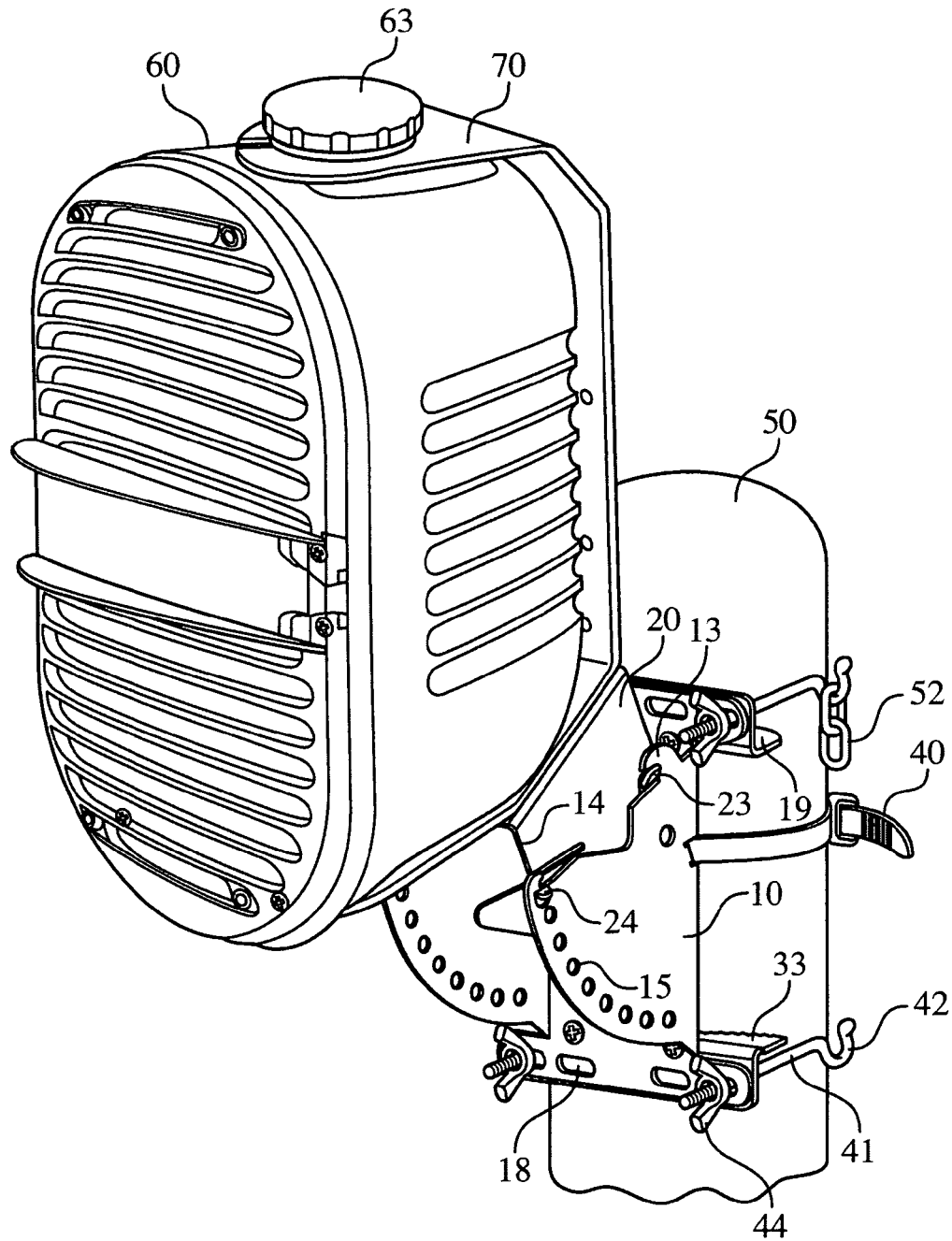
FIG. 11 shows the entire bracket assembly connected to a speaker and mounted on a pole.

Once speaker 60 is connected to adjustable bracket 20, adjustable bracket 20 can be mounted to stationary bracket 10, which is already connected to a mounting surface or pole, in the manner discussed above with respect to FIGS. 1-9, to form a pole-mounted speaker, as shown in FIG. 11. In this Figure, adjustable bracket 20 has just been placed on stationary bracket 10, prior to being moved into its final adjustment position and secured with screws, which is done in the manner described with respect to FIGS. 5-6.

Accordingly, while only a single embodiment of the present invention has been shown and described, it is obvious that many changes and modifications may be made thereunto without departing from the spirit and scope of the invention.

What is claimed is:

1. A bracket assembly comprising:
    a stationary bracket for attachment to a pole or surface; the stationary bracket comprising:
        a mounting plate having mounting holes for attachment to a surface or pole; and
        two side walls extending perpendicular to the mounting plate, each side wall having a front hook and a rear hook on a top surface thereof; and an adjustable bracket adapted to be mounted on the stationary bracket, the adjustable bracket having a front surface and two side walls, and comprising front and rear tabs on each side wall corresponding to the front and rear hooks, such that the adjustable bracket is attached to the stationary bracket in a preliminary mounting position by placing the tabs into the front and rear hooks.

2. The mounting bracket assembly according to claim 1, wherein the stationary bracket has a plurality of adjustment apertures located along each side wall, and wherein the adjustable bracket has an angle adjustment wing located on each side wall, and wherein the mounting bracket assembly is rotated into a final mounting position from the preliminary mounting position by squeezing the angle adjustment wings together until the front tabs are released from the front hooks, rotating the adjustable bracket downward until a desired position is reached, and placing the front tabs into a closest one of the adjustment apertures in the stationary bracket.

3. The mounting bracket assembly according to claim 2, wherein each side wall of the adjustable bracket has a screw aperture, and further comprising a securing screw, the securing screw being placed through the screw aperture and an overlapping adjustment aperture in the stationary bracket when the final mounting position is reached.

4. The mounting bracket assembly according to claim 2, further comprising an axel aperture in the side walls of the stationary bracket and an axel aperture in the adjustable bracket, wherein the axel aperture in the stationary bracket overlaps the axel aperture in the adjustable bracket when the adjustable bracket is placed in the preliminary mounting position, and further comprising a pair of axel screws that are placed in through the overlapping axel apertures in the preliminary mounting position to support the adjustable bracket as it is rotated into the final mounting position.

5. The mounting bracket assembly according to claim 1, further comprising a pole mounting assembly attached to the stationary bracket, the pole mounting assembly comprising:
at least one pole adaptor bracket, having a rear wall for attachment to a top or bottom of the stationary bracket, and a front section having a cut-out portion for accommodating a pole;
a pair of hooks inserted through apertures in said at least one pole adaptor bracket; and
a chain for securing the pole adaptor bracket on a pole via the hooks, wherein
the stationary bracket is mounted on a pole by connecting the at least one pole adaptor bracket to the stationary bracket, attaching said pair of hooks to the pole adaptor bracket such that the hooks extend away from the pole adaptor bracket toward the pole, wrapping a chain around the pole between the hooks, and securing the chain on the hooks to secure the stationary bracket to the pole.

6. The mounting bracket assembly according to claim 5, wherein there are two pole adaptor brackets, two pairs of hooks and two chains.

7. The mounting bracket assembly according to claim 5, wherein the hooks have threaded ends that are attached to the pole adaptor bracket with wing nuts, and wherein adjusting the wing nuts adjusts tension in the chain.

8. The mounting bracket assembly according to claim 1, further comprising a speaker mounting bracket attached to the adjustable bracket, such that a speaker is mounted to a surface or pole by attaching the speaker to the speaker mounting bracket, attaching the stationary bracket to the surface or pole, and coupling the adjustable bracket to the stationary bracket.

* * * * *